(12) United States Patent
Kawan et al.

(10) Patent No.: US 6,745,247 B1
(45) Date of Patent: Jun. 1, 2004

(54) METHOD AND SYSTEM FOR DEPLOYING SMART CARD APPLICATIONS OVER DATA NETWORKS

(75) Inventors: Joseph C. Kawan, Hollywood, CA (US); Harold Taylor, Torrance, CA (US)

(73) Assignee: Citicorp Development Center, Inc., Los Angeles, CA (US)

( * ) Notice: Subject to any disclaimer, the term of this patent is extended or adjusted under 35 U.S.C. 154(b) by 0 days.

(21) Appl. No.: 09/527,769

(22) Filed: Mar. 17, 2000

(Under 37 CFR 1.47)

Related U.S. Application Data

(60) Provisional application No. 60/125,154, filed on Mar. 19, 1999.

(51) Int. Cl.[7] .................. G06F 15/16; G06F 15/173
(52) U.S. Cl. .................. 709/245; 709/238; 709/250
(58) Field of Search .................. 709/245, 250, 709/238, 239, 242; 705/41, 65; 902/26

(56) References Cited

U.S. PATENT DOCUMENTS

| | | | |
|---|---|---|---|
| 5,602,918 A | | 2/1997 | Chen et al. .................. 380/21 |
| 5,742,845 A | * | 4/1998 | Wagner .................. 710/11 |
| 5,761,306 A | | 6/1998 | Lewis |
| 5,796,832 A | | 8/1998 | Kawan |
| 5,806,044 A | | 9/1998 | Powell |
| 5,828,840 A | | 10/1998 | Cowan et al. |
| 5,835,596 A | | 11/1998 | Klemba et al. |
| 5,935,249 A | | 8/1999 | Stern et al. |
| 6,370,587 B1 | * | 4/2002 | Hasegawa et al. .......... 709/245 |
| 2001/0018660 A1 | * | 8/2001 | Sehr .................. 705/5 |

FOREIGN PATENT DOCUMENTS

| | | | |
|---|---|---|---|
| WO | WO 98/49658 | 11/1998 | .......... G07F/19/00 |

OTHER PUBLICATIONS

Search Report conducted by the Australian Patent Office for Singapore Application No. SG 0001480–3, dated Aug. 29, 2001 (mailing date).
Written Opinion conducted by the Australian Patent Office for Singapore Application No. SG 0001480–3, dated Aug. 29, 2001 (mailing date).
E. Hechler, IBM, "Architecture & Operations Domain," *Java Card Forum Technical Committee Meeting*, Munich, Sep. 22–24, 1998, 14 pp.
Barnes, Darryl, "Java Card Application Development," *Dr. Dobb's Journal*, 24, 2, 72(1), Feb., 1999.
Spooner, John G. and Kerstetter, Jim, "Battening Down PC Hatches," *PC Week*, 33(1), Nov. 2, 1998.
Unknown, "Java: Sun Microsystems Announces Java Card API . . . ," *Work–Group Computing Report*, v. 7, n. 338, p. 15(1), Nov. 4, 1996.
Friedman, Matthew, "Microsoft, Sun Set Smart Card Stage—Java Card spec, development kit released," *Internetweek*, n. 687, p. 27, 1997.

(List continued on next page.)

*Primary Examiner*—Zarni Maung
(74) *Attorney, Agent, or Firm*—George T. Marcou; Kilpatrick Stockton LLP

(57) ABSTRACT

The present invention permits ISO-7816 smart cards and their non-smart card supporting devices to be connected and to interact over networks, such as networks based on Internet Protocol (IP), broadband, and wide area networks (WAN) using the T=1 protocol, similarly to if these devices were connected locally. Broadly, the invention takes a node address in a small T=1 embedded terminal and maps each address into a network address or a Universal Resource Locator (URL), such that different components of the terminal that are T=1 addressable are able to exist throughout for example, an IP network. The advantages offered by the invention include security and speed, resulting in increased ease of use and application development and increased autonomy for the smart card itself.

56 Claims, 10 Drawing Sheets

OTHER PUBLICATIONS

International Standard, ISO 7816–1, "Identification Cards—Integrated Circuit(s) Cards With Contacts—Part 1: Physical Characteristics," First Edition, Jul. 1, 1987, Reference No. ISO 7816–1:1987 (E).

International Standard, ISO 7816–2, "Identification Cards—Integrated Circuit(s) Cards With Contacts—Part 2: Dimensions and Location of the Contacts," First Edition, May 15, 1988, Reference No. ISO 7816–2:1988 (E).

International Standard, ISO/IEC 7816–3, "Identification Cards—Integrated Circuit(s) Cards With Contacts—Part 3: Electronic Signals and Transmission Protocols," First Edition, Sep. 15, 1989, Reference No. ISO/IEC 7816–3:1989 (E).

International Standard, ISO/IEC 7816–3, "Identification Cards—Integrated Circuit(s) Cards With Contacts—Part 3: Electronic Signals and Transmission Protocols, Amendment 1: Protocol Type T=1, Asynchronous Half Duplex Block Transmission Protocol," First Edition, Sep. 15, 1989, Amendment 1, Dec. 1, 1992, Reference No. ISO/IEC 7816–3:1989/Amd. 1:1992 (E).

International Standard, ISO/IEC 7816–3, "Identification Cards—Integrated Circuit(s) Cards With Contacts —Part 3: Electronic Signals and Transmission Protocols, Amendment 2: Revision of Protocol Type Selection," First Edition, Sep. 5, 1989, Amendment 2, Dec. 1, 1994, Reference No. ISO/IEC 7816–3:1989/Amd. 2:1994 (E).

International Standard, ISO/IEC 7816–4, "Information Technology—Identification Cards—Integrated Circuit(s) Cards With Contacts—Part 4: Interindustry Commands for Interchange," First Edition, Sep., 1995, Reference No. ISO/IEC 7816–4:1995 (E).

International Standard, ISO/IEC 7816–5, "Identification Cards—Integrated Circuit(s) Cards With Contacts—Part 5: Numbering System and Registration Procedure for Application Identifiers," First Edition, Jun. 15, 1994, Reference No. ISO/IEC 7816–5:1994 (E).

International Standard, ISO/IEC 7816–1, "Identification Cards—Integrated Circuit(s) Cards With Contacts—Part 1: Physical Characteristics," First Edition, Oct. 15, 1998, Reference No. ISO/IEC 7816–1:1998 (E).

International Standard, ISO/IEC 7816–2, "Information Technology—Identification Cards—Integrated Circuit(s) Cards with Contacts—Part 2: Dimensions and Location of the Contacts," First Edition, Mar. 1, 1999, Reference No. ISO/IEC 7816–2:1999 (E).

International Standard, ISO/IEC 7816–3, "Information Technology—Identification Cards—Integrated Circuit(s) Cards With Contacts—Part 3: Electronic Signals and Transmission Protocols," Second Edition, Dec. 15, 1997, Reference No. ISO/IEC 7816–3:1997 (E).

International Standard, ISO/IEC 7816–4, "Information Technology –Identification Cards –Integrated Circuits(s) Cards With Contacts –Part 4: Interindustry Commands for Interchange," First Edition, Sep. 1, 1995, Reference No. ISO/IEC 7816–4:1995 (E).

International Standard, ISO/IEC 7816–4, "Information Technology—Identification Cards—Integrated Circuit(s) Cards With Contacts—Part 4: Interindustry Commands for Interchange, Amendment 1: Impact of SecureMessaging on the Structures of APDU Messages," First Edition, Sep. 1, 1995, Amendment 1, Dec. 15, 1997, Reference No. ISO/IEC 7816–4:1995/Amd. 1:1997 (E).

International Standard, ISO/IEC 7816–5, Identification Cards—Integrated Circuits(s) Cards With Contacts—Part 5: Numbering System and Registration Procedure for Application Identifiers,' First Edition, Jun. 15, 1994, Reference No. ISO/IEC 7816–5:1994 (E).

International Standard, ISO/IEC 7816–5, "Identification Cards—Integrated Circuit(s) Cards With Contacts—Part 5: Numbering System and Registration Procedure for Application Identifiers, Amendment 1," First Edition Jun. 15, 1994, Amendment 1, Dec. 15, 1996, Reference No. ISO/IEC 7816–5:1994/Amd. 1:1996 (E).

International Standard, ISO/IEC 7816–6, "Identification Cards—Integrated Circuit(s) Cards With Contacts—Part 6: Interindustry Data Elements," First Edition, May 15, 1996, Reference No. ISO/IEC 7816–6:1996 (E).

International Standard, ISO/IEC 7816–6:1996, Technical Corrigendum 1, "Identification Cards—Integrated Circuit(s) Cards With Contacts—Part 6: Interindustry Data Elements, Technical Corrigendum 1," Apr. 1, 1998, Reference No. ISO/IEC 7816–6:1996/Cor. 1:1998 (E).

International Standard, ISO/IEC 7816–6, "Identification Cards—Integrated Circuit(s) Cards With Contacts, Part 6: Interindustry Data Elements, Amendment 1: 1C Manufacturer Registration," First Edition, May 15, 1996, Amendment 1, Jun. 15, 2000, Reference No. ISO/IEC 7816–6:1996/Amd. 1:2000 (E).

International Standard, ISO/IEC 7816–7, "Identification Cards—Integrated Circuit(s) Cards With Contacts, Part 7: Interindustry Commands for Structured Card Query Language (SCQL)," First Edition, Mar. 1, 1999, Reference No. ISO/IEC 7816–7:1999 (E).

International Standard, ISO/IEC 7816–8, "Identification Cards—Integrated Circuit(s) Cards With Contacts—Part 8: Security Related Interindustry Commands," First Edition, Oct. 1, 1999, Reference No. ISO/IEC 7816–8:1999 (E).

International Standard, ISO/IEC 7816–10, "Identification Cards—Integrated Circuit(s) Cards With Contacts—Part 10: Electronic Signals and Answer to Reset for Synchronous Cards," First Edition, Nov. 1, 1999, Corrected and Reprinted Feb. 15, 2000, Reference No. ISO/IEC 7816–10:1999 (E).

* cited by examiner

| Node Address | Node Address Handler | Application Component |
|---|---|---|
| 0 | SmartCard_A_Driver | SmartCard_A |
| 1 | UserInterface_Handler | UserInterface |
| 2 | SmartCard_B_Driver | SmartCard_B |
| 3 | TransactionLogHandler | TransactionLog |
| 4 | Unused | Unused |
| 5 | Unused | Unused |
| 6 | Unused | Unused |
| 7 | Router | Router |

Fig. 1

| Node Address | Coupling | Node Address Handler | Application Component | Network Address | Port |
|---|---|---|---|---|---|
| 0 | IODevice | SmartCard_A_Driver | SmartCard_A | N/A | N/A |
| 1 | Coresident | UserInterface_Handler | UserInterface | N/A | N/A |
| 2 | Network | TCP/IP_Session_Handler | SmartCard_B | 127.22.50.19 | 125 |
| 3 | Coresident | TransactionLogHandler | TransactionLog | N/A | N/A |
| 4 | | Unused | Unused | | |
| 5 | | Unused | Unused | | |
| 6 | | Unused | Unused | | |
| 7 | Coresident | Router | Router | N/A | N/A |

Fig. 2

| Node Address | Coupling | Node Address Handler | Application Component | Network Address | Port |
|---|---|---|---|---|---|
| 0 | Network | TCP/IP_Socket_A_Handler | SmartCard_A | 127.22.31.100 | 120 |
| 1 | Network | TCP/IP_Socket_B_Handler | UserInterface | 127.22.31.140 | 121 |
| 2 | IODevice | SmartCard_B_Driver | SmartCard_B | N/A | N/A |
| 3 | NotConnected | | TransactionLog | N/A | N/A |
| 4 | | Unused | Unused | | |
| 5 | | Unused | Unused | | |
| 6 | | Unused | Unused | | |
| 7 | Coresident | Router | Router | N/A | N/A |

Fig. 3

METHOD AND SYSTEM FOR DEPLOYING SMART CARD APPLICATIONS OVER DATA NETWORKS

CROSS-REFERENCE TO RELATED APPLICATION

This application claims priority to applicant's co-pending application having U.S. Serial No. 60/125,154 filed Mar. 19, 1999.

FIELD OF INVENTION

The present invention relates to a method and system for sending data and other information based on protocol standards developed by the International Standards Organization (ISO), related to smart card applications, and more particularly to a method and system for deployment of smart card applications on data networks, such as IP and broadband in view of ISO-7816.

BACKGROUND OF THE INVENTION

Smart cards have been employed in the field of financial transaction systems to store value, owing to their ability to contain cryptographic engines and store secret keys securely. As such, they have come to be regarded as a cheap tamper-proof repository for secure data, such as loyalty value, personal identification (ID) information, and even cash value.

All smart card applications are built around a standard specified by the International Standards Organization (ISO) as ISO-7816. This standard specifies a framework for storing data within the card and a basic operating Application Programming Interface (API) for commanding the card to perform its functions.

All smart card applications requiring cryptographic authentication usually require two or more smart cards, one card held by an entity desiring authentication and another card held by an authenticating authority that carries out the authenticating protocol defined by the application. This authentication process involves the two smart cards exchanging data in some form of a challenge and response scenario.

The ISO-7816 committee was well aware that many applications would require multiple smart cards, as well as non smart card devices, to support the applications. These devices include user interface displays, data storage, and keyboards. The committee also knew that these smart card devices and non-smart card supporting devices would need to be addressable from within any card or device within the application. As a result, the committee specified that smart card devices and supporting devices could optionally communicate with each other on a simple bus network, for which a protocol for an application component device was described to facilitate interaction between the devices over this bus.

The name given to the protocol was T=1, and it merely required that any data going into or out of any component device within the application be prepended with a header that specified the device address from which the data was sent, called a Source Node Address, and a device address, to which the application desired the data be sent, called the Destination Node Address.

Under the protocol, the T=1 Router within the application would route data to the Destination Node Address specified in the header. Application designers who did not desire to avail themselves of this feature would use the T=0 protocol, in which no header is prepended to data going to or from the smart card.

Typical applications for the T=1 protocol are microprocessor-based purchase terminals for smart card based cash applications, in which the T=1 addressable nodes are always hard-wire connected together and consequently reside on the same circuit board. These terminals typically are used in retail establishments to transfer value from a customer's smart card to the merchant's smart card. However, there is a growing need for these same applications to run in topologies where the T=1 addressable Nodes cannot be wired together as they are in an embedded terminal. One such topology is a network application where one smart card may be on a personal computer (PC) on the Internet and another may be in an Internet Server.

The ISO committee did not address the issue of smart cards and their supporting non-smart card application components communicating over a network. Consequently, no standards currently exist in the ISO-7816 specification for connecting smart card application components over a network.

There is therefore a recognized need in the art for an application that connects and allows for secure and quick data transfer over networks.

SUMMARY OF THE INVENTION

An embodiment of the present invention advantageously permits ISO-7816 smart cards and their non-smart card supporting devices to be connected and interact over IP, broadband and Wide Area Networks (WAN) networks using the T=1 protocol, just as if they were connected locally. The invention takes a node address in a T=1 embedded terminal and maps each address into a network address, such as a Universal Resource Locator (URL), such that different components of the terminal that are T=1 addressable may exist throughout, for example, an IP network. The advantages offered by the invention include security and speed, resulting in increased ease of use. Furthermore, the invention gives the smart card autonomy and independence by enabling it to contain within itself all the network addresses of the components of the application of which it is a part.

Smart card addressable nodes and non-smart card addressable nodes can send and receive data to and from any other Addressable Node with no "knowledge" of where those addressable nodes may be located (e.g., in the microprocessor's memory, on a device connected by serial IO line, or on a computer on a remote network). This provides an improvement over the prior art by allowing embedded smart card applications to be ported to large networks with little modification.

The present invention also allows new applications to be developed that can avail themselves of a network connectivity mechanism that allows programs inside the smart cards themselves to autonomously configure the network topology and then issue commands to send and receive data to the application components of the network.

In one embodiment, the present invention relates to a method for routing data between a microprocessor on a smart card and a component device over at least one network. The method comprises sending data from the microprocessor on the smart card to a router through a smart card address handler. The router is preferably an extended T=1 router and includes a first extended routing table. The data is then routed over the network. In routing the data, the data is sent from the router to a network-coupled address handler to the network. The data from the smart card may be routed to an internet protocol network, to a broadband network, to a wide area network or another network through which data is normally sent. The data is received at a second router that is hard wire connected to the component device. In receiving the data at the second router, the data is received from the network and sent through a second network-coupled address handler to the second router. The second router is preferably an extended T=1 router and comprises a second extended routing table. The data is then sent from the second router to the component device through a node address handler. In one embodiment, the second component is a security access module. The security access module may be a second smart card that authenticates the first smart card. In another embodiment, the component device may be a terminal application responsible for starting and operating a terminal. In a further embodiment, the component device may be a data storage device, responsible for storing data from smart cards in non-volatile memory. In another embodiment, the component device may be a terminal having a display device and an input device, such as a keyboard or a mouse.

In another embodiment, data is routed between a first cluster and a second cluster over at least one network. The data is sent from the first cluster to a network by sending the data from a first component device through a first node address handler to a first router and through a network-coupled address handler to the network. In one embodiment, the first component device is a smart card having a microprocessor. The first router is preferably an extended T=1 router, including a first extended routing table. From the network, the data is received at the second cluster. To receive the data at the second cluster, the data is received from the network at a second network-coupled address handler. The data is then sent through a second router and a second node address handler to a second component device. In one embodiment, the second component device is a security access module, including a second smart card that authenticates a smart card from the first cluster. The second router is preferably an extended T=router, including an extended routing table.

In another method for sending data between a first cluster and a second cluster over at least one network, the first cluster may comprise more than one component device, where each component device has its own node address handler associated with it. Data is sent from the first cluster to a network by sending data from one of the component devices through the node address handler associated with the component device to a router. The router is preferably an extended T=1 router, including an extended routing table. From the router, the data is sent through a network-coupled address handler to the network. In one embodiment, a first component device in the first cluster is a smart card having a microprocessor. A second component device in the first cluster may be a terminal having a display device and a keyboard. The data may be sent from the first cluster to the second cluster over an internet protocol network, over a broadband network, over a wide area network or over another network through which data is normally sent. The data is received from the network at the second cluster. In an embodiment of the present invention, the second cluster may include more than one component device, where each component device has its own node address handler associated with it. In receiving the data at the second cluster, data is received from the network at a second network-coupled address handler and sent through a router to one of the component devices via the node address handler associated with the component device. The router is preferably an extended T=1 router, including an extended routing table. In one embodiment of the present invention, a first component device in the second cluster is a security access module, including a second smart card that authenticates a smart card in the first cluster. A second component device in the second cluster may be a data storage device, wherein the data storage device and the smart card send and receive data using the node address handlers and the second router. Among other functions, the data storage device may be responsible for storing data from smart cards in non-volatile memory. In another embodiment, a third component device in the second cluster is a clearing and settlement device.

Another embodiment of the present invention relates to a system for routing data between a smart card having a microprocessor and a component device over at least one network. The system includes means for sending data from the smart card to a first router. The means for sending the data from the smart card to the first router is preferably a first smart card address handler. The system further comprises means for routing the data over a network. The means for routing the data over the network preferably include the first router and a first network-coupled address handler. The first router is preferably an extended T=1 router, including an extended routing table. In an embodiment of the present invention, the data may be routed over an internet protocol network, over a broadband network, over a wide area network or over another network through which data is normally sent. An embodiment of a system for routing data between a smart card and a component over a network further comprises means for receiving the data at a second router. The means for receiving the data at the second router preferably comprises a second network-coupled address handler. The second router is also preferably an extended T=1 router, including an extended routing table. An embodiment of the system of the present invention also comprises means for sending the data from the second router to the component device. The means for sending the data from the second router to the component device preferably comprises a node address handler. In one embodiment of the present invention, the component device is a security access module, including a second smart card that authenticates the first smart card. In another embodiment, the component device may be a terminal application responsible for starting and operating a terminal. In a further embodiment, the component device may be a data storage device, responsible for storing data from smart cards in non-volatile memory. In another embodiment, the component device may be a terminal having a display device and a keyboard.

Another embodiment of the present invention relates to a system for routing data between a first cluster and a second cluster over at least one network. The system comprises means for sending data from the first cluster to the at least one network and means for receiving the data from the at least one network at the second cluster. The means for sending the data from the first cluster to a network preferably comprise a first component device, a first node address handler, a router and a network-coupled address handler found in the first cluster. In one embodiment, the first component device is a smart card having a microprocessor. The router is preferably an extended T=1 router, including an extended routing table. In another embodiment, the first cluster may comprise more than one component device and a node address handler associated with each component device. In addition to a smart card, another component device in the first cluster may be a terminal having a display device and a keyboard. In addition to communicating with each other, the component devices in the first cluster may also communicate with component devices in other clusters by utilizing a system of the present invention. In a preferred embodiment of the present invention, the means for sending data from the first cluster to the at least one network further comprises a network-coupled address handler coupled to each network. The first cluster may send data to the second cluster over an internet protocol network, over a broadband network, over a wide area network or over another network through which data is normally sent. According to an embodiment of the present invention, the means for receiving the data from the network at the second cluster comprise a second network-coupled address handler, a second router, a second node address handler and a second component device. In one embodiment, the component device in the second cluster is a security access module, including a second smart card that authenticates the smart card in the first cluster. The second router is preferably an extended T=1 router, including an extended routing table. In another embodiment, the second cluster may comprise more than one component device and a node address handler associated with each component. For example, if a first component device in the second cluster is a security access module, a second component device in the second cluster may be a data storage device. The data storage device and the smart card would preferably communicate with each other using the node address handlers and the second router. In a still further embodiment, a third component device in the second cluster may be a clearing and settlement device, which preferably communicates with the other components using the node address handlers and the second router.

A still further embodiment of a system for routing data between at least two clusters over at least one network comprises a first hard wired cluster comprising at least one component device, a node address handler associated with each component device, a router and at least one network-coupled address handler. The system further comprises a second hard wired cluster comprising at least one component device, a node address handler associated with each component device, a router and at least one network-coupled address handler. A component device in the first cluster sends data via the node address handler associated with the component device in the first cluster to the router in the first cluster. The router in the first cluster sends data through a network-coupled address handler in the first cluster to a network. The router in the second cluster receives the data from the network via a network-coupled address handler in the second cluster. A component device in the second cluster receives the data from the router in the second cluster via the node address handler associated with the component device in the second cluster. The routers in each cluster are extended T=1 routers. The data may be sent over an internet protocol network, over a broadband network, over a wide area network or over another network through which data is normally sent. A cluster may be coupled to more than one network through a network-coupled address handler associated with each network. For example, a cluster may be coupled to both an internet protocol network and a broadband network through a network-coupled address handler associated with each network. Additionally, each cluster may be coupled to the same network through more than one network-coupled address handler.

Additional objects, advantages and novel features of the invention will be set forth in part in the description which follows, and in part will become more apparent to those skilled in the art upon examination of the following or may be learned by practice of the invention.

BRIEF DESCRIPTION OF THE DRAWINGS

FIG. 1 illustrates a T=1 Routing Table instituting the ISO-7816 specifications.

FIG. 2 illustrates an Extended Routing Table according to an embodiment of the present invention.

FIG. 3 illustrates an Extended Routing Table according to an embodiment of the present invention.

DETAILED DESCRIPTION OF THE INVENTION

Figure 4:
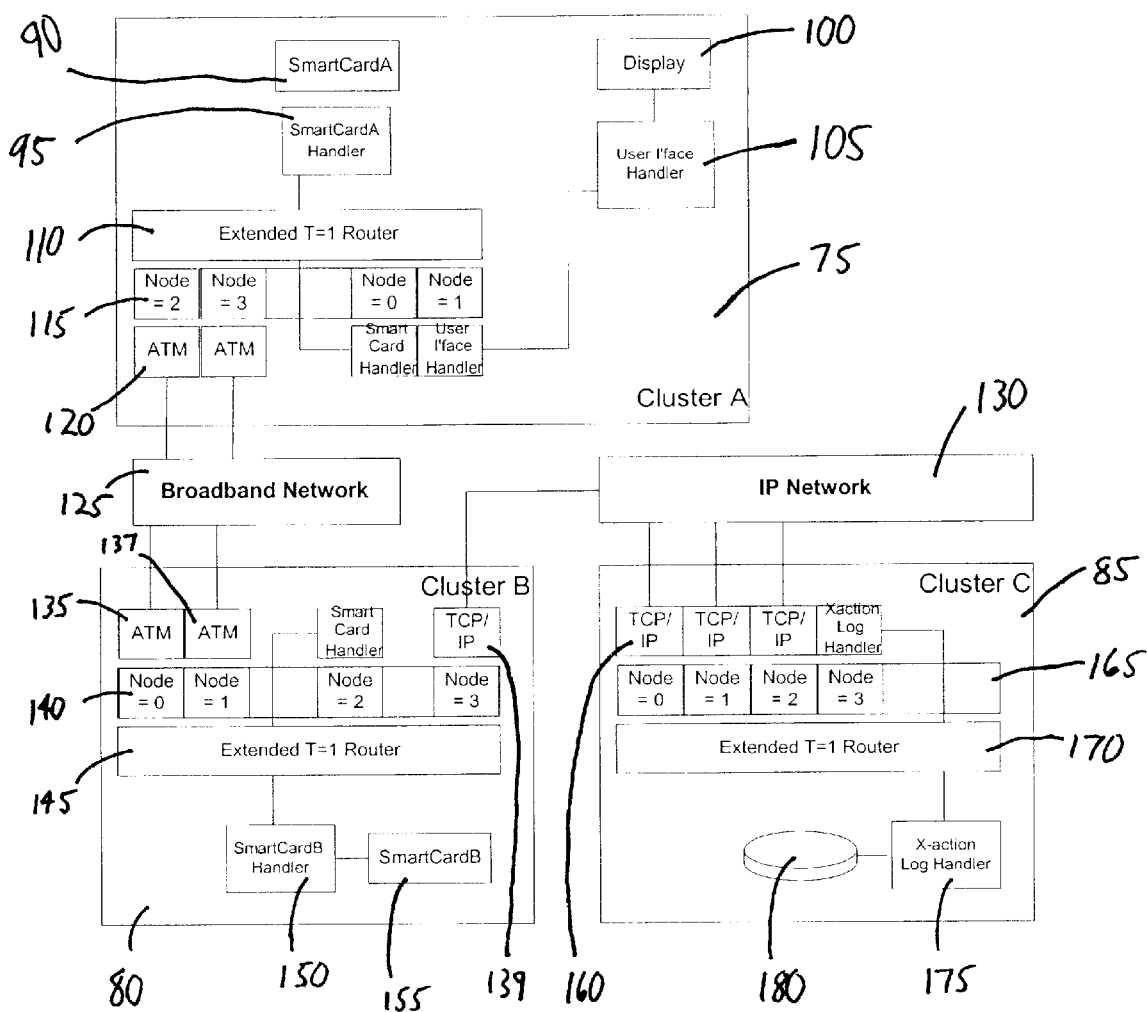
FIG. 4 is a schematic diagram which illustrates an overview of examples of key components and the flow of data between the key components for an embodiment of the present invention in which data is sent between three clusters over a broadband network and an internet protocol network.

FIG. 1 shows a T=1 Routing Table 5 implied in the ISO-7816 specification for use with an embodiment of the present invention. Since the application expects all the Addressable Nodes to be resident on the same circuit board, the sole function of the Routing Table 5 is to map each of the eight possible Node Addresses to a software procedure.

In FIG. 1, the Node Address 10 is the T=1 node address assigned to the component 20 by the application and may have any of the values {0–7}. The Routing Table 5 illustrated in FIG. 1 is for a simple hypothetical embedded application according to an embodiment of the present invention. In this embodiment, Node Address 0 is assigned to the smart card requiring authentication and Node Address 1 is assigned to the user interface. Node Address 2 is assigned to the smart card providing the authentication, and Node Address 3 is assigned to a logging program that stores transaction activity records in memory.

The ISO-7816 specification also specifies a Router program that has the function of handling all communications between the addressable Nodes of the application, the routing algorithm being:

```
while (ORIGINATOR_SAD is not equal DAD)
  {Routing_Table[DAD].Node_Address_Handler
    (Transmit, SAD, ApplicationData);
```

Routing_Table[DAD].Node_Address_Handler (Receive, DAD, ApplicationData)}

Return response ApplicationData to ORIGINATOR_SAD

Where ORIGINATOR_SAD is the Source Node Address of the originator of a message consisting of ApplicationData destined to a Destination Node Address, DAD. The DAD may change each time new ApplicationData is received from a Node Address, which of course gives any Node the freedom to route ApplicationData to any other Node in the system before it returns a response to the ORIGINATOR_SAD.

An embodiment of the present invention includes a Routing Table Extension to the Routing Table in FIG. 1 and an Extended T=1 Router. An Extended Routing Table 25 is shown in FIG. 2, in which the simple embedded application described by the Routing Table in FIG. 1 has been modified to run in accordance with an embodiment of the present invention. The Node Address field 30, as in the original Routing Table, is the T=1 Node Address assigned to the component 45 by the application and may have the values of {0–7}.

The Coupling field 35 specifies how the component 45 is connected to the local Router. It may have the values of {Coresident, Input/Output Device (IODevice), Network, NotConnected}.

The Coresident Coupling type specifies that the component 45 is a program on the same circuit board as the Routing Table 25 and that its Node Address Handler 40 is a software procedure. In the Routing Table in FIG. 1, all of the Node Addresses have an implied Coupling type of "Coresident".

According to an embodiment of the present invention, the IODevice Coupling type specifies that the component 45 addressed by the Node Address 30 is on an IO device connected to the same circuit board on which the Routing Table 25 is resident.

The Network Coupling type specifies that the component 45 addressed by Node Address 30 is not resident on the circuit board on which the Routing Table 25 resides, but resides on a processor that is connected to the circuit board of the Routing Table by a network connection. Entries in the routing table having a coupling type of "Network" may also specify the network address and port number of the node in the fields "Network Address" and "Port" of the extended routing table. FIGS. 2 and 3 show extended routing tables 25,50 having Network Address 47,72 and Port 49,74 fields.

The NotConnected Coupling type specifies that no connection exists in the application with any Node Address marked NotConnected.

An embodiment of the present invention defines addressable Node components that share the same circuit board or hardware or are otherwise not Coupled by Network coupling as Clusters. A single Node by itself on a circuit board without any other components sharing the hardware with that particular Node is considered one Cluster. The application configuration described in the Routing Table in FIG. 1 for one embodiment would consist of a single Cluster. The configuration in FIG. 2 for one embodiment consists of two Clusters, one to encompass Node Addresses 0,1,3,7 and one to encompass Node Address 2.

In an embodiment of the present invention, each Cluster contains an Extended Routing Table, which specifies the path to the other addressable Nodes in the application. Nodes that reside in other Clusters are marked with a Coupling type of Network. FIGS. 2 and 3 present the Extended Routing Tables 25, 50 of the two Clusters belonging to a simple hypothetical application in accordance with an embodiment of the present invention.

In an embodiment of the present invention, Node Address Handlers are defined by the invention to be programs callable by the Invention's Extended Router to send ApplicationData to a Node associated with the Node Address Handler and to receive ApplicationData from the Node associated with the Node Address Handler. Accordingly, the invention specifies that the Node Address handlers have a send and receive interface.

Node Address Handlers of the Coresident Coupling type in an embodiment of the present invention, represent a program that writes the ApplicationData to a display screen and then returns. Node Address Handlers of the IODevice type call device drivers controlling the component Nodes, such as smart card readers attached to a serial port. Finally, Node Address Handlers of the Network Coupling type call Send and Receive programs that have passed ApplicationData to and from Transmission Control Protocol/Internet Protocol (TCP/IP) Sockets, Asynchronous Transfer Mode (ATM) Channels or the data channels defined by any data transmission protocol, such as frame relay or system network architecture (SNA).

The Network Address field 47, 72 (FIGS. 2 and 3) of the Network Coupling type in an embodiment of the present invention represents the network address of the machine or cluster in which the node described by this entry resides. Values that this field may take in the case of an IP network are a URL or a four part IP address as given in the extended routing tables 25, 50 shown in FIGS. 2 and 3.

The Port field 49, 74 (FIGS. 2 and 3) of the Network Coupling type in an embodiment of the present invention represents the port identifier by which the process implementing the node within the machine or cluster is known. The Port field can be used by the system to locate a specific node within a machine or cluster when multiple nodes are in the same cluster or machine, and therefore share the same network address.

FIG. 4 is a schematic diagram which illustrates an overview of examples of key components and the flow of data between the key components for an embodiment of the present invention in which data is sent between three clusters over a broadband network and an internet protocol network. In FIG. 4, the component devices 90, 100, 155, 180 of the application, both smart card and non-smart card, are distributed in three Clusters 75, 80, 85 over two networks, a Broadband network 125 of the kind found in Cable television distribution and an IP network 130 of the kind used to deliver Internet content. Cluster A 75 is a cable television set top box with a smart card reader 90 and a user display apparatus 100, such as, for example, a television screen. Cluster B 80 is a server connected to the cable operator's broadband headend 125 via ATM channels 135. The server has a smart card 155, which is used to authenticate requests from the subscriber's smart card 90. Cluster C 85 is a remote server on the internet 130 that logs authentication activity.

Each Cluster has an Extended T=1 Router 110, 145, 170 and an Extended Routing Table 115, 140, 165, which links Node Addresses to network channels or locally connected IO devices. Each component device 90, 100, 155, 180 has a node address handler 95, 105, 150, 175 associated with it.

The present invention may also be used as a network bridge to connect smart cards and non-smart card supporting devices that are not connected to the same network. For example, in FIG. 4, the Transaction Log 180 for the application is located by itself in Cluster C 85, which has no direct connection with the smart card 90 in Cluster A 75, but the Cluster A smart card 90 can send ApplicationData to the Log 180 because the Cluster B Server has both a Broadband connection via two of its network-coupled address handlers 135, 137 at Node=0 and Node=1, and an IP connection via a network-coupled address handler 139 at Node=3. Node=3 has been configured with a TCP/IP connection to connect with the same in Cluster C 85, the cluster with the Transaction Log 180.

The advantages of a system according to the embodiment shown in FIG. 4 include security and speed. The security results from taking advantage of the natural authentication properties of the smart card devices, such that the need for third party authentication packages requiring, for example, certificates and certificates servers may be avoided. Because the invention allows transactions to occur over networks as if they were occurring off-line between physically connected, secure devices, the data remains encrypted, thus avoiding the need for use of a secure sockets layer (SSL). The speed of the system results from taking advantage of such things as Internet-based high data rate specifications for sound. Further, the invention allows for direct communication between a smart card and a server, through bypassing of, for example, a browser.

Figure 5:
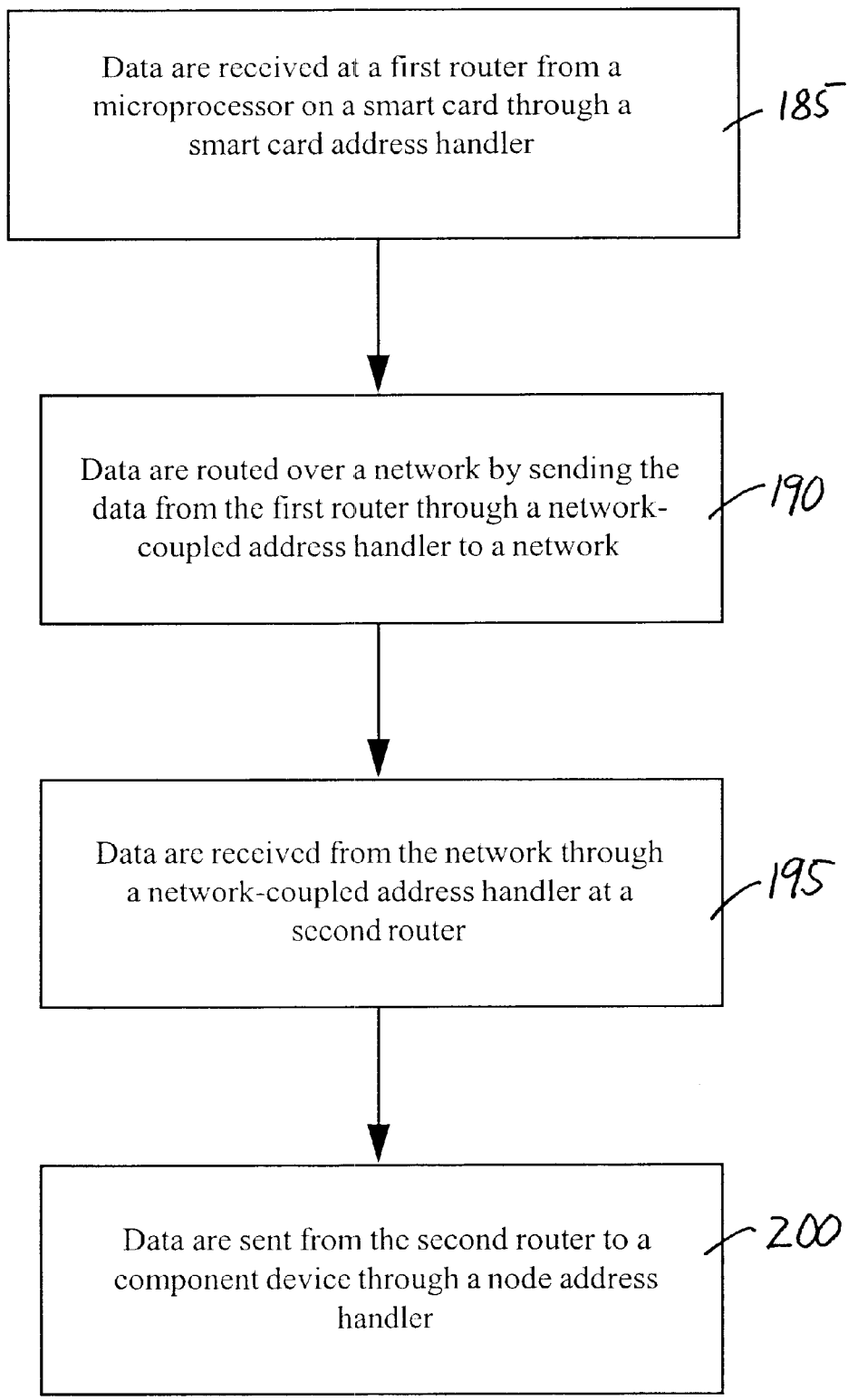
FIG. 5 is a flow chart which illustrates an embodiment of a method of the present invention for sending data between a smart card and a component over at least one network.

FIG. 5 is a flow chart illustrating an embodiment of a method of the present invention for sending data between a smart card and a component device over at least one network. According to this embodiment, data are received 185 at a first router from a microprocessor on a smart card through a smart card address handler. The first router preferably comprises an extended T=1 router having an extended routing table. The data are then routed 190 over a network by sending the data from the first router through a network-coupled address handler to a network. The network may be an internet protocol network, a broadband network, a wide area network, or any other network over which data are normally sent. The type of network-coupled address handler will depend on the network. For example, if the network is a broadband network, the network-coupled address handler will be an asynchronous transfer mode (ATM) channel. The data are received 195 from the network through a network-coupled address handler at a second router. The second router also preferably comprises an extended T=1 router having an extended routing table. The data are sent 200 from the second router to a component device through a node address handler. The component device may be, for example, a data storage device, a terminal having an input device and a display device, a terminal application, a clearing and settlement device or a security access module. A security access module may further comprise a second smart card that authenticates the first smart card. An example of a function of the terminal application would be for starting and operating a terminal. Examples of functions of a data storage device include storing data from smart cards in non-volatile memory and logging transaction activity. An example of a function of a clearing and settlement device is the uploading of smart card transaction data to a bank's server.

Figure 6:
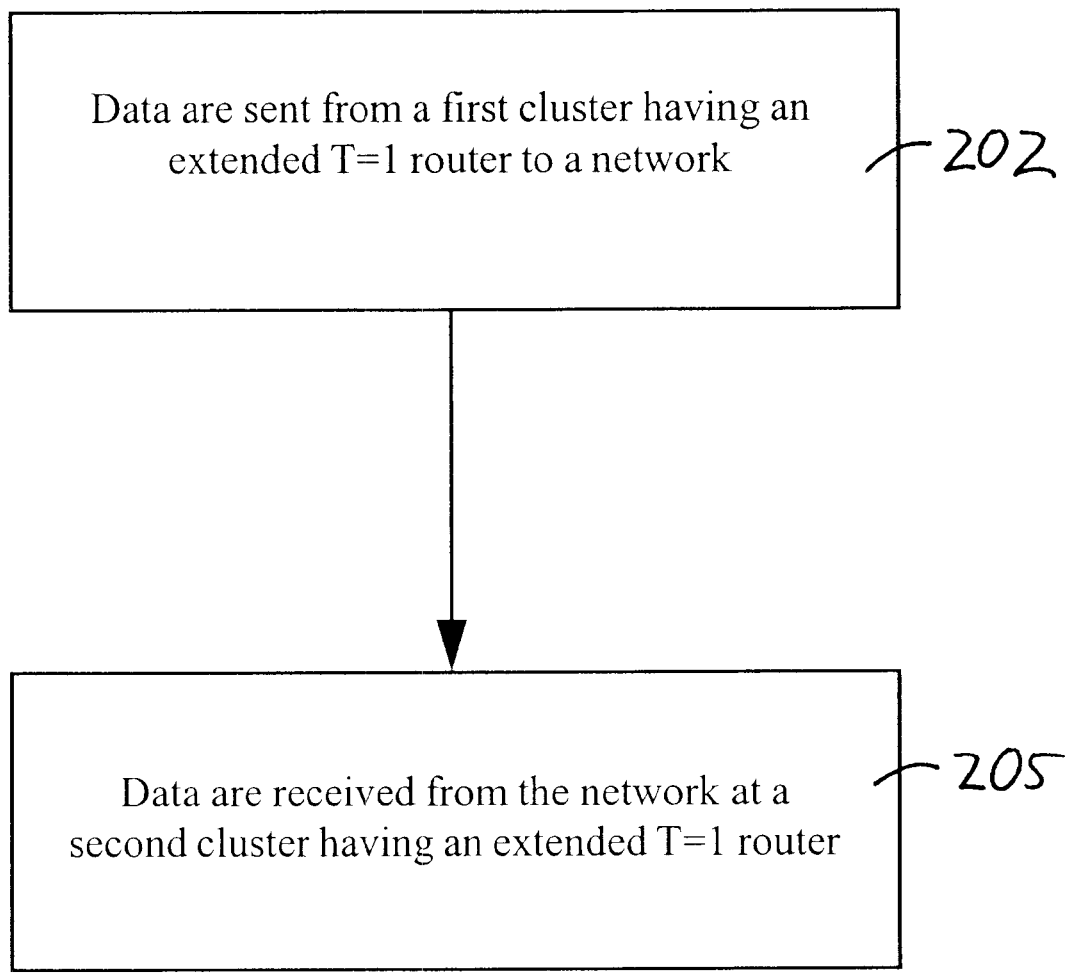
FIG. 6 is a flow chart which illustrates an embodiment of a method of the present invention for sending data between a first cluster and a second cluster over at least one network.

FIG. 6 is a flow chart illustrating an embodiment of a method of the present invention for sending data between a first cluster and a second cluster over at least one network. According to this embodiment, data are sent 202 from a first cluster having an extended T=1 router to a network. The network may be an internet protocol network, a broadband network, a wide area network, or any other network over which data are normally sent. Sending of data from the first cluster preferably further comprises sending the data from a first component device through a first node address handler to the first extended T=1 router and through a first network-coupled address handler to the network. The first component device may be, for example, a smart card having a microprocessor. According to this embodiment, the data are then received 205 from the network at a second cluster having an extended T=1 router. Receiving of data at the second cluster preferably further comprises receiving the data from the network at a second network-coupled address handler and sending the data through the second extended T=1 router and a second node address handler to a second component device. The component device may be, for example, a data storage device, a terminal having an input device and a display device, a terminal application, a clearing and settlement device, a security access module or other component device or application that uses a T=1 router. The extended T=1 routers preferably further comprise extended routing tables. The first and second clusters may each comprise more than one component device. For example, the first cluster may comprise a smart card having a microprocessor and a terminal having a display device and an input device. The second cluster may comprise, for example, a security access module for authenticating a smart card in the first cluster and a data storage device for logging transaction activity. Each component device in a cluster preferably has its own node address handler associated with it. Although the above description relates to the transfer of data from a first cluster to a second cluster, data may also easily be sent from the second to the first cluster using the same method.

Figure 7:
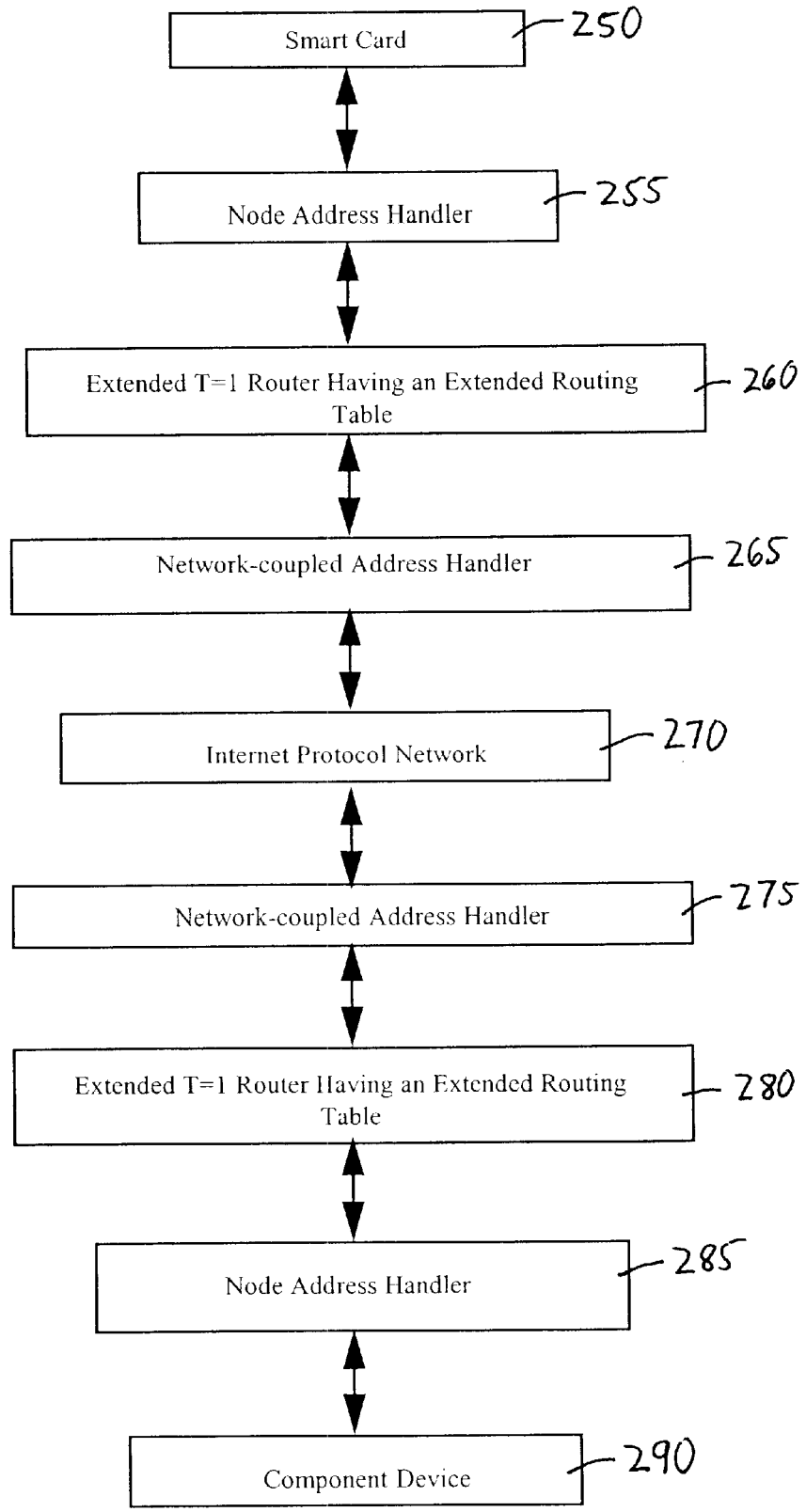
FIG. 7 is a schematic diagram which illustrates an overview of examples of key components and the flow of data between the key components for an embodiment of the present invention in which data is sent from a smart card to a component over an internet protocol network.

Other embodiments of the present invention relate to systems for routing data between T=1 applications over a network. FIG. 7 is a schematic diagram which illustrates an overview of examples of key components and the flow of data between the key components for an embodiment of a system of the present invention in which data is sent from a smart card to a component device over an internet protocol network. FIG. 7 shows an extended T=1 router 260 that receives data from a smart card 250 having a microprocessor through a node address handler 255. The data is routed over an internet protocol network 270 from the extended T=1 router 260 through a network-coupled address handler 265. The data is received at another extended T=1 router 280 from the internet protocol network 270 via a network-coupled address handler 275. The data is sent from the extended T=1 router 280 through a node address hander 285 to a component device 290. The extended T=1 routers 260, 280 preferably further comprise extended routing tables. The component device 290 may be, for example, a data storage device, a terminal having an input device and a display device, a terminal application, a clearing and settlement device, a security access module or other component device or application that uses a T=1 router.

Figure 8:
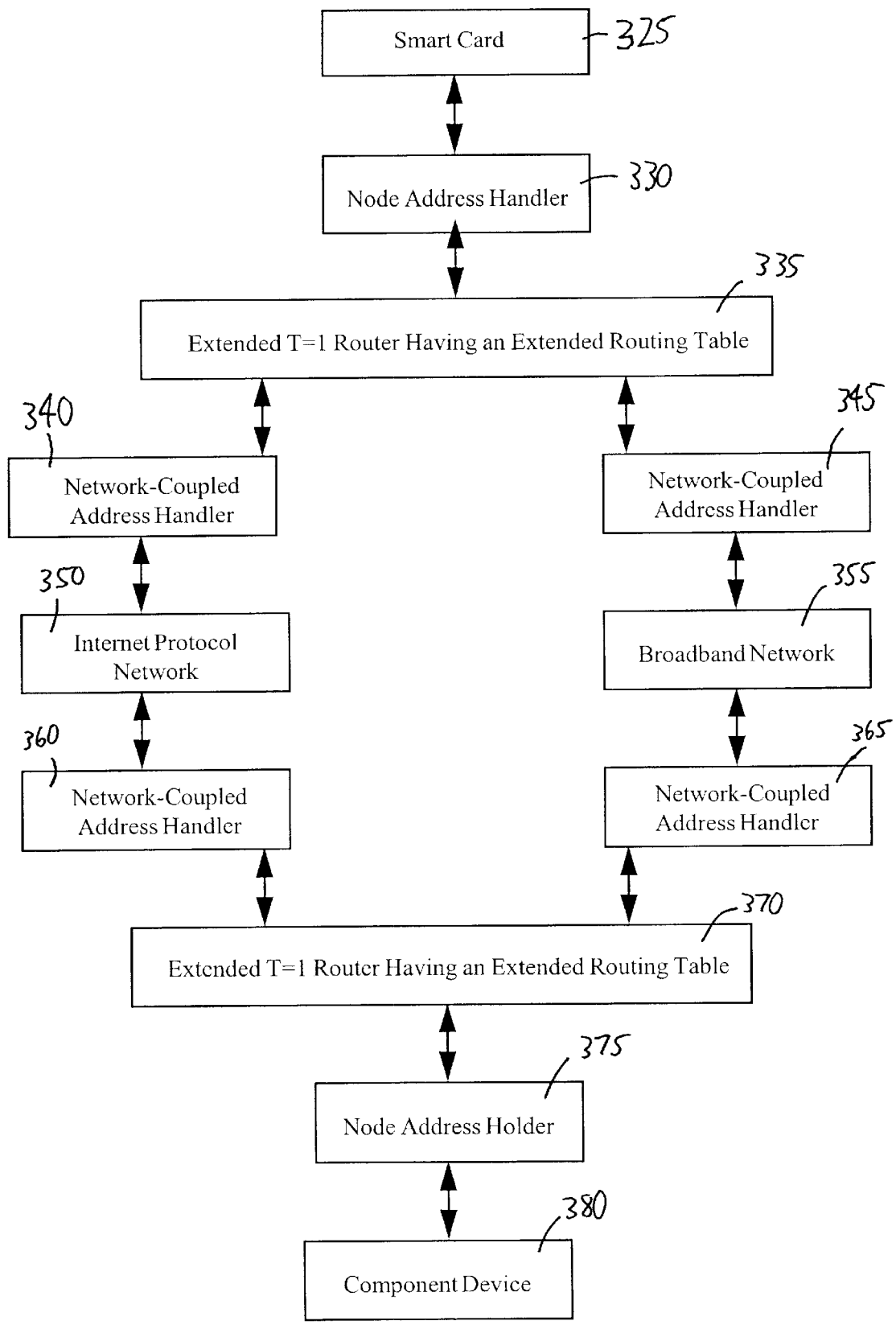
FIG. 8 is a schematic diagram which illustrates an overview of examples of key components and the flow of data between the key components for another embodiment of the present invention in which data is sent from a smart card to a component over an internet protocol network or over a broadband network.

FIG. 8 is a schematic diagram which illustrates an overview of examples of key components and the flow of data between the key components for another embodiment of the present invention in which data is sent from a smart card to a component over an internet protocol network or over a broadband network. In the embodiment shown in FIG. 8, data is sent from a microprocessor in the smart card 325 to a node address handler 330. An extended T=1 router having an extended routing table 335 receives the data from the node address handler 330. The extended T=1 router 335 is coupled with both an internet protocol network 350 and a broadband network via two network-coupled address handlers 340, 345. The data may be sent over the internet protocol network 350 or the broadband network 355. The data is received at a second extended T=1 router 370 having an extended routing table from the internet protocol network 350 via network-coupled address handler 360 or from the broadband network 355 via network-coupled address handler 365. The data is sent from the extended T=1 router 370 through a node address handler 375 to a component device 380. The component device 290 may be, for example, a data storage device, a terminal having an input device and a display device, a terminal application, a clearing and settlement device, a security access module or any other component device or application that uses a T=1 router. This embodiment may further comprise the sending of data through a wide area network or other network through which data is normally sent.

Figure 9:
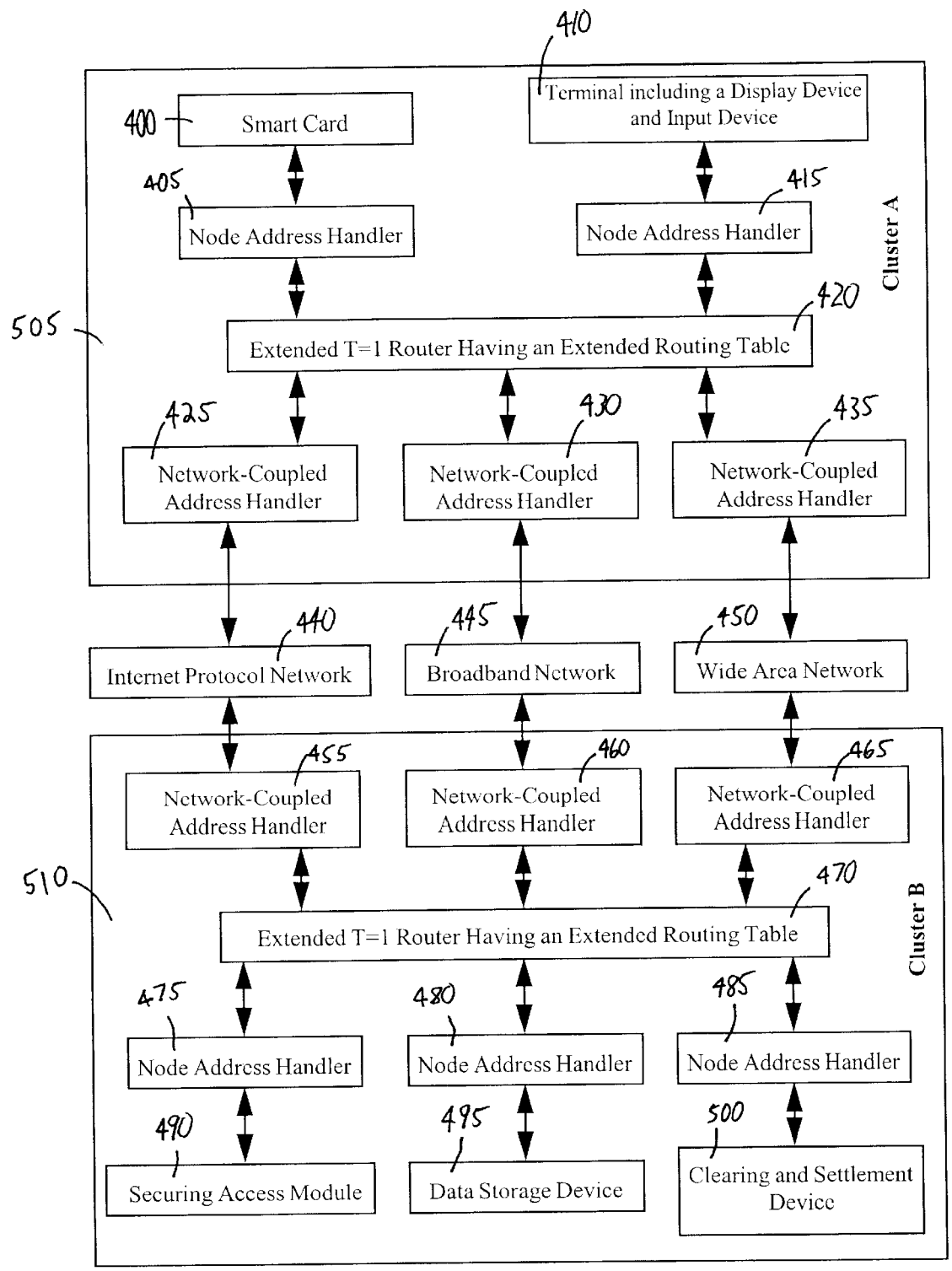
FIG. 9 is a schematic diagram which illustrates an overview of examples of key components and the flow of data between the key components for another embodiment of the present invention in which data is sent from a first cluster to a second cluster over an internet protocol network, over a broadband network or over a wide area network.

FIG. 9 is a schematic diagram which illustrates an overview of examples of key components and the flow of data between the key components for another embodiment of the present invention in which data is sent from a first cluster to a second cluster over an internet protocol network, over a broadband network or over a wide area network. FIG. 9 shows a first cluster 505 having two component devices, a smart card 400 and a terminal including a display device and an input device 410. Each of the component devices 400, 410 may send data to an extended T=1 router having an extended routing table 420 through respective node address handlers 405, 415. Extended T=1 router 420 in the embodiment shown may send data over three networks, an internet protocol network 440, a broadband network 445, and a wide area network 450. Any network through which data is normally transmitted may be used with the present invention. Data may be transmitted from the extended T=1 router 420 to one of the networks via the network-coupled address handlers 425, 430, 435 coupled with the respective networks 440, 445, 450. A second cluster 510 receives the data from one of the networks 440, 445, 450 at one of the network-coupled address handlers 455, 460, 465. Each network is coupled 440, 445, 450 with an address handler 455, 460, 465. The data is sent from one of the network-coupled address handlers to an extended T=1 router having an extended routing table 470 in the second cluster 510. The data may be sent from the T=1 router to a component device in the second cluster 510 via a node address handler. The embodiment of the present invention shown in FIG. 9 comprises three component devices in the second cluster 510, a security access module 490, a data storage device 495 and a clearing and settlement device 500. As noted above, the security access module 490 may further comprise a second smart card that authenticates the first smart card. Examples of functions of the data storage device 495 include storing data from smart cards in non-volatile memory and logging transaction activity. An example of a function of the clearing and settlement device 500 is the uploading of smart card transaction data to a bank's server.

Figure 10:
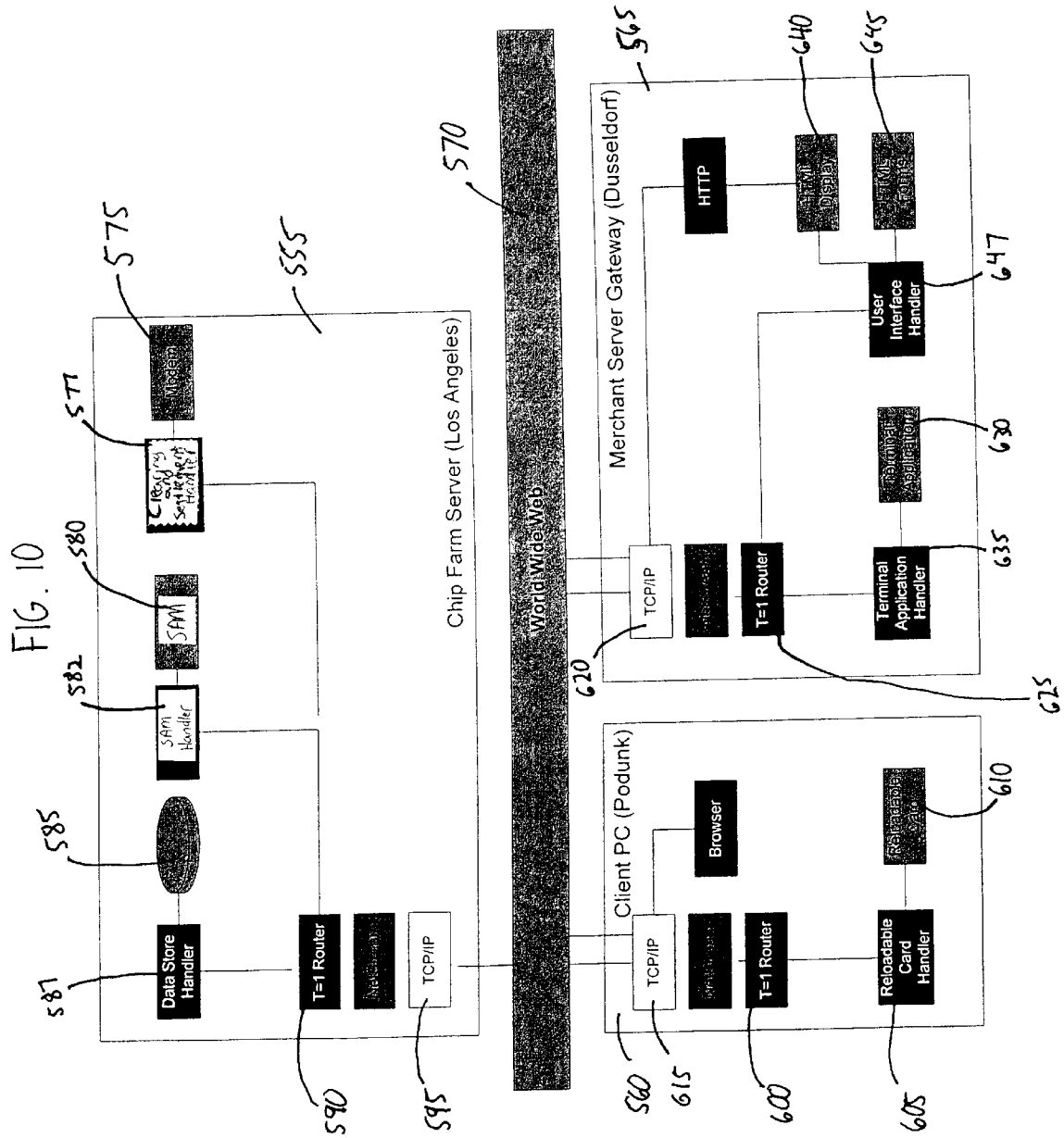
FIG. 10 is a schematic diagram which illustrates an overview of examples of key components and the flow of data between the key components for another embodiment of the present invention in which data is sent between three clusters over an internet protocol network.

FIG. 10 is a schematic diagram which illustrates an overview of examples of key components and the flow of data between the key components for another embodiment of the present invention in which data is sent between three clusters over an internet protocol network. FIG. 10 shows three clusters 555, 560, 565 in different geographic locations, each having an extended T=1 router, 590, 600, 625. In this embodiment, the three clusters 555, 560, 565 are able to send and receive data from the other clusters over an internet protocol network 570, the world wide web. A first cluster 560 comprises a reloadable card 610, which sends data through a reloadable card handler 605 to the extended T=1 router 600. The extended T=1 router sends the data through a network-coupled address handler 615 to the world wide web 570. The data may be routed over the world wide web to component devices in the other two clusters 555, 565. The second cluster comprises three component devices, a clearing and settlement device (operating through a modem) 575, a security access module (SAM) 580 and a data storage device 585. Each of these component devices can send and receive data from an extended T=1 router 590 via a node address handler 577, 582, 587 associated with it. For example, the security access module 580 may send and receive data from extended T=1 router 590 through a security access module handler 582. The extended T=1 router 590 sends and receives data from the world wide web 570 through a network-coupled address handler 595. The third cluster 565 comprises two components, a terminal application 630 and a user interface illustrated in FIG. 10 by an HTML display 640 and HTML forms 645. In one embodiment, the user interface sends and receives data from an extended T=1 router 625 in the third cluster 565 through a node address handler, shown as a user interface handler 647. The terminal application 630 sends and receives data from the extended T=1 router 625 through its node address handler, shown as a terminal application handler 635. The extended T=1 router 625 likewise sends and receives data from the world wide web through a network-coupled address handler 620.

An example of the operation of the system shown in FIG. 10, may involve a user inserting a reloadable card 610 in the first cluster 560. The reloadable card handler 605 receives data from the reloadable card and sends it to the extended T=1 router 600. The data is routed over the world wide web 570 from the extended T=1 router 600 via the network-coupled address handler 615. The data from the reloadable card 610 may be identification information for authentication of the reloadable card 610. In such a scenario, the data would be routed from the world wide web 570 to the second cluster 555. The data would be sent from the world wide web 570 to the extended T=1 router 590 through the network-coupled address handler 595. From the extended T=1 router 590, the data would be sent through the SAM handler 582 to the security access module 580, where the reloadable card 610 would be authenticated. Data relating to the authentication may be sent to the data storage device 585 in the second cluster 555 through the SAM handler 582, the extended T=1 router 590, and the data store handler 587. Likewise, the data relating to the authentication may be sent to a component device in the third cluster.

The type of network-coupled address handler in each embodiment of the present invention will depend on the network. For example, if the network is a broadband network, the network-coupled address handler will be an asynchronous transfer mode (ATM) channel.

In the present invention, each component device is capable of sending or receiving data from other component devices in the same cluster and of sending and receiving data from component devices in other clusters by implementing the systems and methods of the present invention.

Various preferred embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the present invention. Accordingly, the invention is only limited by the following claims.

What is claimed is:

1. A method for routing data between a microprocessor in a smart card and a component device over at least one network comprising:

receiving data at a first extended T=1 router having an extended routing table that maps all node addresses in a T=1 embedded terminal to a network address from the microprocessor in the smart card through a first smart card address handler of the smart card that is callable by the first extended router to send data to a node associated with the address handler and to receive data from the node associated with the address handler;

routing the data from the first router through a first network-coupled address handler over the at least one network;

receiving the data from the at least one network and sending the data through a second network-coupled address handler to a second extended T=1 router having a second extended routing table; and sending the data from the second router through a node address handler to the component device.

2. The method of claim 1, wherein routing the data over the at least one network further comprises routing the data over an internet protocol network.

3. The method of claim 1, wherein routing the data over the at least one network further comprises routing the data over a broadband network.

4. The method of claim 1, wherein routing the data over the at least one network further comprises routing the data over a wide area network.

5. The method of claim 1, wherein the component device comprises a security access module.

6. The method of claim 5, wherein the security access module comprises a second smart card that authenticates the first smart card.

7. The method of claim 1, wherein the component device comprises a terminal application.

8. The method of claim 1, wherein the component device comprises a data storage device.

9. The method of claim 1, wherein the component device comprises a terminal having a display device and an input device.

10. A method for routing data between a first cluster and a second cluster over at least one network comprising:

sending data from a first component device of the first cluster, the first component device further comprising a microprocessor in a smart card, through a first node address handler, that is callable by the first extended router to send data to a node associated with the address handler and to receive data from the node associated with the address handler, to a first extended T=1 router having a first extended routing table, that maps all possible node addresses in a T=1 embedded terminal to a network address, and through a first network-coupled address handler to the at least one network; and receiving the data from the at least one network at a second network-coupled address handler and sending the data through the second extended T=1 router having a second extended routing table and a second node address handler to a second component device at the second cluster.

11. The method of claim 10, wherein sending data from the first cluster to the at least one network further comprises sending data from the first cluster to an internet protocol network.

12. The method of claim 10, wherein sending data from the first cluster to the at least one network further comprises sending data from the first cluster to a broadband network.

13. The method of claim 10, wherein sending data from the first cluster to the at least one network further comprises sending data from the first cluster to a wide area network.

14. The method of claim 10, wherein sending the data through the second extended T=1 router and the second node address handler to the second component device further comprises sending the data through the second extended T=1 router and a second node address handler to a security access module.

15. The method of claim 14, wherein the security access module further comprises a second smart card that authenticates a first smart card in the first cluster.

16. The method of claim 10, wherein the first cluster comprises more than one component device and a node address handler associated with each component device.

17. The method of claim 16, wherein a second component device in the first cluster further comprises a terminal having a display device and an input device.

18. The method of claim 10, wherein sending the data from the first cluster to the at least one network further comprises sending the data from one of the component devices through the node address handler associated with the component device to the first extended T=1 router.

19. The method of claim 10, wherein the second component device further comprises a security access module that authenticates a smart card in the first cluster.

20. The method of claim 10, wherein the second cluster comprises more than one component and a node address handler associated with each component.

21. The method of claim 20, wherein receiving the data from the at least one network at the second cluster further comprises sending the data through the second extended T=1 router to one of the component devices via the node address handler associated with the component device.

22. The method of claim 20, wherein a first component in the second cluster further comprises a security access module that authenticates a smart card in the first cluster.

23. The method of claim 22, wherein a second component in the second cluster further comprises a data storage device.

24. The method of claim 23, wherein the data storage device and the security access module send and receive data using the node address handlers and the second extended T=1 router.

25. The method of claim 23, wherein a third component in the second cluster further comprises a clearing and settlement device.

26. The method of claim 25, wherein the data storage device, the security access module and the clearing and settlement device send and receive data using the node address handlers and the second extended T=1 router.

27. A system for routing data between a smart card and a component device over at least one network comprising:

a first network-coupled smart card address handler that is callable by a first extended T=1 router to send data to a node associated with the address handler and to receive data from the node associated with the address handler and that is adapted for sending data from the smart card to the first extended T=1 router having a first extended routing table that maps all possible node addresses in a T=1 embedded terminal to a network address;

wherein the first network-coupled address handler and the first extended T=1 router are further adapted for routing the data over the at least one network;

a second extended T=1 router having a second extended routing table and adapted for receiving the data via a second network-coupled address handler; and a node address handler adapted for sending the data from the second router to the component device.

28. The system of claim 27, wherein the at least one network further comprises an internet protocol network.

29. The system of claim 27, wherein the at least one network further comprises a broadband network.

30. The system of claim 27, wherein the at least one network further comprises a wide area network.

31. The system of claim 27, wherein the component device further comprises a security access module.

32. The system of claim 31, wherein the security access module further comprises a second smart card that authenticates the first smart card.

33. The system of claim 27, wherein the component device further comprises a terminal application.

34. The system of claim 27, wherein the component device further comprises a data storage device.

35. The system of claim 27, wherein the component device further comprises a terminal having a display device and a keyboard.

36. A system for routing data between a first cluster and a second cluster over at least one network comprising:
- a first component device, the first component device further comprising a smart card microprocessor, a first extended T=1 router having a first extended routing table that maps all possible node addresses in a T=1 embedded terminal to a network address, a first node address handler that is callable by the first extended router to send data to a node associated with the address handler and to receive data from the node associated with the address handler, and a network-coupled address handler of the first cluster, the first component device being adapted for sending data from the first cluster to the at least one network; and
- a second network-coupled address handler, a second extended T=1 router having an extended routing table, a second node address handler, and a second component device adapted for receiving the data from the at least one network at the second cluster.

37. The system of claim 36, wherein the at least one network further comprises an internet protocol network.

38. The system of claim 36, wherein the at least one network further comprises a broadband network.

39. The system of claim 36, wherein the at least one network further comprises a wide area network.

40. The system of claim 36, wherein the first cluster further comprises more than one component device and a node address handler associated with each component.

41. The system of claim 40, wherein a second component device in the first cluster further comprises a terminal having a display device and an input device.

42. The system of claim 36, wherein means for sending data from the first cluster to the at least one network further comprises a network-coupled address handler coupled to each network.

43. The system of claim 36, wherein the second component further comprises a security access module.

44. The system of claim 43, wherein the security access module further comprises a second smart card that authenticates the first smart card.

45. The system of claim 36, wherein the second cluster comprises more than one component device and a node address handler associated with each component.

46. The system of claim 45, wherein a first component device in the second cluster further comprises a security access module further comprising a smart card that authenticates a smart card in the first cluster.

47. The system of claim 46, wherein a second component device in the second cluster further comprises a data storage device.

48. The system of claim 47, wherein the data storage device and the security access module in the second cluster communicate using the node address handlers and the second extended T=1 router.

49. The system of claim 47, wherein a third component device in the second cluster further comprises a clearing and settlement device.

50. The system of claim 49, wherein the cleaning and settlement device communicates with the other component devices using the node address handlers and the second extended T=1 router.

51. A system for routing data between at least two clusters over at least one network comprising:
- a first hard wired cluster comprising at least one component device, a T=1 router having an extended a routing table that maps all possible node addresses in a T=1 embedded terminal to a network address, a node address handler associated with each component device that is callable by the T=1 router to send data to a node associated with the address handler and to receive data from the node associated with the address handler, and at least one network-coupled address handler; and
- a second hard wired cluster comprising at least one component device, a T=1 router having an extended a routing table, a node address handler, and at least one network-coupled address handler;
- wherein the at least one component device in the first cluster sends data via the node address handler associated with the component device in the first cluster to the T=1 router in the first cluster, wherein the T=1 router in the first cluster sends data through the at least one network-coupled address handler in the first cluster to the at least one network, wherein the T=1 router in the second cluster receives the data from the at least one network via the at least one network-coupled address handler in the second cluster, and wherein a component device in the second cluster receives the data from the T=1 router in the second cluster via the at least one node address handler associated with the component device in the second cluster.

52. The system of claim 51, wherein the at least one network further comprises an internet protocol network.

53. The system of claim 52, wherein a second network further comprises a broadband network.

54. The system of claim 53, wherein a third network further comprises a wide area network.

55. The system of claim 52, wherein a second network further comprises a wide area network.

56. The system of claim 52, wherein a second network further comprises a second internet protocol network.

* * * * *

UNITED STATES PATENT AND TRADEMARK OFFICE
CERTIFICATE OF CORRECTION

PATENT NO.    : 6,745,247 B1
DATED         : June 1, 2004
INVENTOR(S)   : Joseph C. Kawan and Harold Taylor It is certified that error appears in the above-identified patent and that said Letters Patent is hereby corrected as shown below:

<u>Column 16,</u>
Line 14, please change "The system of claim 49, wherein the cleaning and" to -- The system of claim 49, wherein the clearing and --.

Signed and Sealed this

Twenty-ninth Day of November, 2005

JON W. DUDAS
*Director of the United States Patent and Trademark Office*